(12) United States Patent
Malakian et al.

(10) Patent No.: US 7,663,528 B1
(45) Date of Patent: Feb. 16, 2010

(54) MISSILE BOOST-BALLISTIC ESTIMATOR

(75) Inventors: Kourken Malakian, Mount Laurel, NJ (US); Sabrina M. Chowdhury, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 133 days.

(21) Appl. No.: 12/051,892

(22) Filed: Mar. 20, 2008

(51) Int. Cl.
*G01S 7/42* (2006.01)
(52) U.S. Cl. ........................................ 342/13; 342/26 A
(58) Field of Classification Search ................... 342/13, 342/26 A
See application file for complete search history.

(56) References Cited

U.S. PATENT DOCUMENTS

| | | | |
|---|---|---|---|
| 4,783,744 A * | 11/1988 | Yueh | .......................... 701/221 |
| 7,009,554 B1 | 3/2006 | Mookerjee et al. | |
| 7,026,980 B1 | 4/2006 | Mavroudakis et al. | |
| 7,180,443 B1 | 2/2007 | Mookerjee et al. | |
| 7,295,149 B1 * | 11/2007 | Wolf | .......................... 342/90 |
| 7,394,047 B1 | 7/2008 | Pedersen | |
| 7,511,252 B1 | 3/2009 | Pedersen et al. | |

OTHER PUBLICATIONS

Luu et al., "Kinematic Algorithm for Rocket Motor Apperception," U.S. Appl. No. 11/879,538, filed Jul. 18, 2007.
Luu et al, "Template Updated Boost Algorithm," U.S. Appl. No. 11/868,554, filed Oct. 8, 2007.

* cited by examiner

*Primary Examiner*—Thomas H Tarcza
*Assistant Examiner*—Timothy A Brainard
(74) *Attorney, Agent, or Firm*—Duane Morris LLP

(57) ABSTRACT

A hostile missile engager senses the missile and supplies kinematic data to an interceptor missile fire control processor, which predicts the target's future location with the aid of a powered/unpowered identifier. The identifier passes the kinematic data through filters having lags for powered and unpowered operation, to produce residuals and residual covariances. The probabilities of powered and unpowered motion are determined, and thresholded. If the probability of powered motion or unpowered motion exceeds its threshold, the motion is deemed known. If the target is deemed to be powered, a set of the three-dimensional kinematic features is applied to a nine-state Kalman filter to produce an optimal state. If the target missile is unpowered, a set of the three-dimensional kinematic features corresponding to the second lag is applied to a six-state Kalman filter to produce an optimal state for the unpowered motion. The optimal states control the interceptor toward the target.

4 Claims, 3 Drawing Sheets

MISSILE BOOST-BALLISTIC ESTIMATOR

STATEMENT OF GOVERNMENTAL INTEREST

This invention was made with Government support under Contract/Grant N00024-03-C-6110 awarded by the Department of the Navy. The United States Government has certain rights in this invention.

BACKGROUND OF THE INVENTION

Modern transportation and military systems place great reliance on systems for tracking airborne or flying objects. In the context of transportation, air traffic control requires that the locations of aircraft be known, preferably with great precision. U.S. Pat. Nos. 7,009,554 and 7,180,443, issued Mar. 7, 2006 and Feb. 20, 2007, respectively, in the name of Mookerjee et al. describe tracking systems generally. In the context of military systems, there is a need to track missiles, both friendly and hostile, and which may be either unpowered (ballistic) or powered (boost). U.S. Pat. No. 7,026,980, issued Apr. 11, 2006 in the name of Mavroudakis et al. describes a system for identifying and tracking a target missile. A missile tracking system described in U.S. patent application Ser. No. 11/879,538, filed Jul. 18, 2007 in the name of Luu et al. describes a system which estimates the location of a missile. Luu et al. make use of a "staging logic and early thrust termination" function for determining the boost or ballistic state, to improve the accuracy of their estimator. A system and method for tracking and engaging a hostile missile is described in U.S. patent application Ser. No. 11/868,554, filed Oct. 8, 2007 in the name of Luu, et al. This system and method also attempts to determine the boost or ballistic state of the missile being tracked. U.S. patent application Ser. No. 11/253,309, filed Oct. 19, 2005 in the name of Wolf, now U.S. Pat. No. 7,295,149, describes a system including a radar sensor, a hostile missile, an interceptor missile, a boost/ballistic determination arrangement, and an interceptor controller using the boost/ballistic determination to aid in interceptor guidance.

It will be clear that an accurate estimate of the location and path of a target missile to be engaged by an interceptor missile requires some knowledge of the boost and ballistic operating condition of the target missile. Improved and or alternative boost/ballistic estimating arrangements are desired.

SUMMARY OF THE INVENTION

A method according to an aspect of the invention is for engaging a target missile with an interceptor missile. The method comprises the steps of sensing three-dimensional or full kinematic features, including at least position of the target missile, to thereby generate sensed kinematic data. The kinematic data includes position, which is at least one of slant range, bearing and elevation. The current value of the three-dimensional kinematic features is or are stored, together with a set of previous values of the three-dimensional kinematic features. At least a portion of the current value of the sensed kinematic data is passed through a first filter having a fixed first filter lag. The first filter is suited for maneuver motion of the missile, and generates first residuals and first residual covariances. At least a portion of the current value of the sensed kinematic data is passed through a second filter having a fixed second filter lag. The second filter is suited for non-maneuver motion of the missile, to generate second residuals and second residual covariances. From the first residuals, the first residual covariances, the second residuals, and the second residual covariances, the probability of being in maneuvering motion and the probability of being in non-maneuvering motion are determined. The probability of being in maneuvering motion tends toward unity when the target missile is in maneuvering motion and tends toward zero when the target missile is in non-maneuvering motion. The probability of being in non-maneuvering motion tends toward unity when the target missile is in non-maneuvering motion and tends toward zero when the target missile is in maneuvering motion. The probability of being in maneuvering motion and the probability of being in non-maneuvering motion are compared with at least one threshold value The target missile is deemed to be in maneuvering motion if the probability of being in maneuvering motion exceeds the threshold value, and the target missile is deemed to be in non-maneuvering motion if the probability of being in non-maneuvering motion exceeds the threshold value. If the target missile is deemed to be in maneuvering motion, a set of the three-dimensional kinematic features corresponding to the first lag is applied to a nine-state Kalman filter to produce an optimal state for the maneuvering motion. The nine states of the nine-state Kalman filter correspond with three position states, three velocity states, and three acceleration states. If the target missile is deemed to be in non-maneuvering motion, a set of the three-dimensional kinematic features corresponding to the second lag is applied to a six-state Kalman filter to produce an optimal state for the non-maneuvering motion. The six states of the six-state Kalman filter correspond to three position states and three velocity states. The optimal states are applied to at least (a) a missile engagement planner for initialization of interceptor guidance and (b) to an interceptor for guidance of the interceptor toward the target missile.

A method according to an aspect of the invention is for estimating or determining transitions between powered and unpowered motion of a target missile. The method comprises the steps of sensing three-dimensional kinematic features of the target. The three-dimensional kinematic features include position, which includes at least one of slant range, bearing and elevation. The sensing of the three-dimensional kinematic features generates sensed kinematic data. The current value of the full set of three-dimensional kinematic features is stored in a memory, which may be a computer memory, together with a set of previous values of the full three-dimensional kinematic features. At least a portion of the current value of the sensed kinematic data is passed through a first filter having a fixed first filter lag, the first filter being suited for or matching powered motion of the missile, to thereby generate first residuals and first residual covariances. At least a portion of the current value of the sensed kinematic data is passed through a second filter having a fixed second filter lag. The second filter is suited for or matching non-powered motion of the missile, to generate second residuals and second residual covariances. From the first residuals, the first residual covariances, the second residuals, and the second residual covariances, determining the probability of being in powered motion and the probability of being in non-powered motion, which probability of being in powered motion tends toward unity when the missile is in powered motion and tends toward zero when the missile is in non-powered motion, and which probability of being in non-powered motion tends toward unity when the missile is in non-powered motion and tends toward zero when the missile is in powered motion. The probability of being in powered motion and the probability of being in non-powered motion are compared with at least one threshold value, to thereby deem the missile to be in powered motion if the probability of being in powered motion exceeds the threshold value, and to deem the missile to be in non-powered motion if the probability of being in non-powered motion exceeds the threshold value. If the missile is deemed to be in powered motion, a set of the full or three-dimensional kinematic features corresponding to the first lag are applied to a nine-state (position velocity acceleration) Kalman filter to produce an optimal state for the powered motion. If the missile is deemed to be in non-powered motion, a set of the three-dimensional or full kinematic features corresponding to the second lag are applied to a six-state Kalman filter (three position states and three velocity states) to produce an optimal state for the non-powered motion.

A method according to another aspect of the invention is for estimating or determining transitions between ACM (Attitude Control Module) and non-ACM motion of an airborne vehicle. The method comprises the steps of sensing three-dimensional kinematic features (including position, which is at least one of slant range, bearing and elevation) of the target, to thereby generate sensed kinematic data. The method includes the steps of storing, as in computer memory, the current value of the three-dimensional or full) kinematic features, and a set of previous values of the three-dimensional kinematic features. At least a portion of the current value of the sensed kinematic data is passed through a first filter having a fixed first filter lag. The first filter is suited for ACM motion of the vehicle to generate first residuals and first residual covariances. At least a portion of the current value of the sensed kinematic data is passed through a second filter having a fixed second filter lag. The second filter is suited for non-ACM motion of the vehicle to generate second residuals and second residual covariances. From (a) the first residuals, the (b) first residual covariances, (c) the second residuals, and (d) the second residual covariances, the probability of being in ACM motion and the probability of being in non-ACM motion are determined. The probability of being in ACM motion tends toward unity when the vehicle is in ACM motion and tends toward zero when the vehicle is in non-ACM motion. The probability of being in non-ACM motion tends toward unity when the vehicle is in non-ACM motion and tends toward zero when the vehicle is in ACM motion. The probability of being in ACM motion and the probability of being in non-ACM motion are compared with at least one threshold value. The vehicle is deemed to be in ACM motion if the probability of being in ACM motion exceeds the threshold value, and is deemed to be in non-ACM motion if the probability of being in non-ACM motion exceeds the threshold value. If the vehicle is deemed to be in ACM motion, a set of the three-dimensional (full) kinematic features corresponding to the first lag is applied to a nine-state Kalman filter to thereby produce an optimal state for the ACM motion. If the vehicle is deemed to be in non-ACM motion, a set of the three-dimensional (full) kinematic features corresponding to the second lag is applied to a six-state Kalman filter (three position states and three velocity states) to produce an optimal state for the non-ACM motion.

DESCRIPTION OF THE INVENTION

Figure 1:
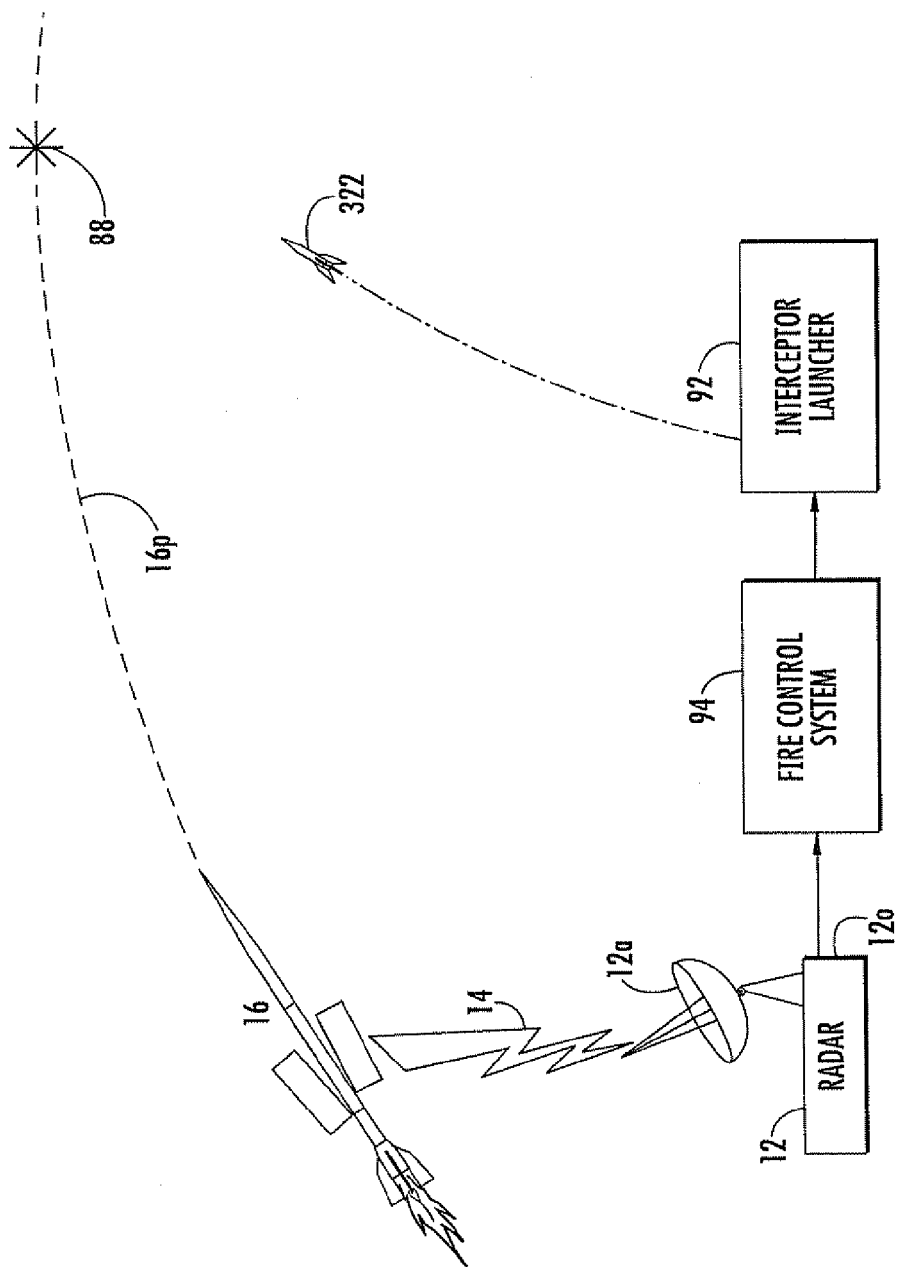
FIG. 1 is a simplified block diagram of a radar arrangement for sensing the kinematic features of a target which may be powered or unpowered, for processing the kinematic features to ultimately produce estimated states of the target, and for using the estimated states of the target to engage the target with an interceptor missile.

In FIG. 1, a system 10 includes a radar 12 with an antenna 12a. Radar 12 generates electromagnetic signals which are transmitted by antenna 12a, as suggested by "lightning bolt" 14. If there is a target within range of the radar 12, a portion of the transmitted signals will be reflected back toward the radar. In this case, a target illustrated as a missile 16 is present. Missile 16 may be in powered (boost) flight, or it may be in unpowered (ballistic) flight. In any case, target 16 causes reflected or return signals return along the same path illustrated as 14 to the radar system. The radar system 12 processes the reflected signals to produce information relating to at least target slant range, and possibly bearing and elevation. These are referred to as "kinematic" features of the target. The kinematic features appear at an output port 12o of radar 12, and are coupled to an interceptor missile fire control system 94. Fire control system 94 estimates the actual current location of the target missile 16, and estimates its trajectory or path 16p. Fire control system 94 generates fire control solutions, initiates the interceptor missile 322 while it is still at the interceptor launcher 92. Fire control system 94 commands a launch of the interceptor missile, and also tracks the location of the interceptor missile 322. Fire control system 94 guides the interceptor 322 toward the expected intercept point 88 after launch.

Figure 2:
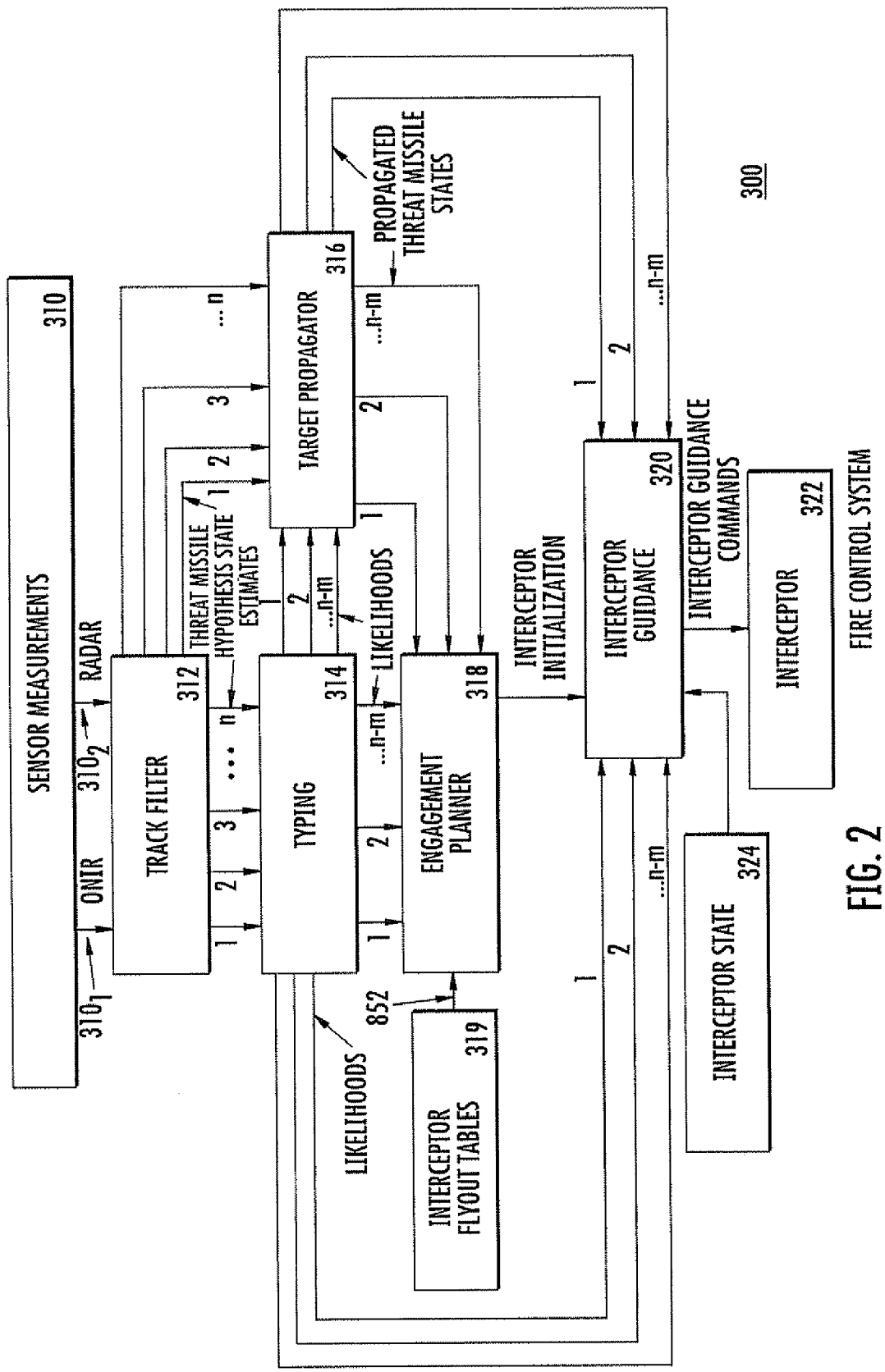
FIG. 2 is a simplified block diagram of a fire control system as described in U.S. patent application Ser. No. 11/430,535, now U.S. Pat. No. 7,511,252, which may be used in the arrangement of FIG. 1.
Figure 3:
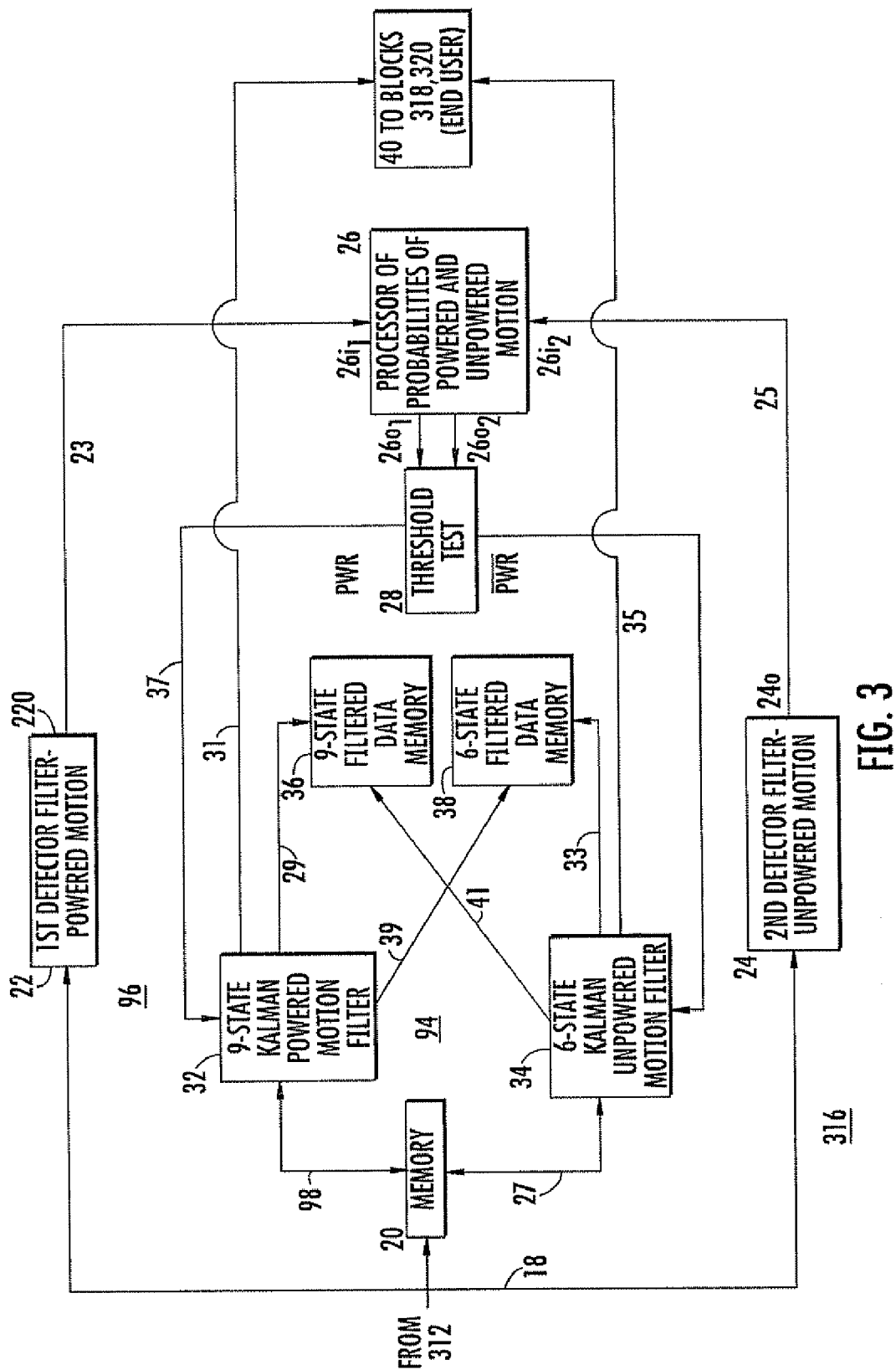
FIG. 3 is a simplified block diagram of a target missile boost/ballistic condition determination arrangement according to an aspect of the invention, which may be used in the target missile tracking system of FIG. 2.

In FIG. 2, the sensor measurements block 310 represents the receipt of signals by way of path 3102 from radar 12 of FIG. 1 and by way of a path 310, from another source, designated Overhead Non-Imaging InfraRed (ONIR). The sensor measurements are applied to a track filter 312, which multihypothesis track filter combines a-priori knowledge of the characteristics of various possible types of threat missiles with the track data from the sensors, to establish separate estimates of the target hypotheses' states (at least position and velocity) for n possible hypotheses. A multihypothesis track filter maintains separate filters for each hypothesis and uses a priori information about each hypothesis to improve the state estimates for each hypothesis over (by comparison with) a filter that uses no a priori information. One implementation of a multihypothesis filter is found in U.S. patent application Ser. No. 11/072,902, filed Mar. 4, 2005 in the name of Mavroudakis et al., and entitled "Missile Identification and Tracking System and Method," now U.S. Pat. No. 7,026,980. The separate estimates consisting of n possible threat/stage hypotheses appear at output ports 1, 2, 3, . . . , n of the track filter 312, and are made available to a typing processor represented as a block 314 and to a target propagator represented as a block 316. Typing algorithm or block 314 uses multiple metrics to determine the likelihood that each hypothesis is correct. These likelihoods sum to unity or one, and this summing characteristic is later used to generate weighting factors for each threat hypothesis. The track filter states from track filter block 312 of FIG. 3 and the likelihoods from typing block 314 are applied to a multihypothesis target propagator block 316. Target propagator block 316 propagates into the future all those threat hypotheses having likelihoods above a threshold level. In one version of the target propagator, the threshold level is fixed. As illustrated in FIG. 3, target propagator block 316 produces n-m propagated threat states, where m is the number of hypotheses with likelihoods falling below the threshold. Significant computational resource savings arise from not propagating the low-likelihood threat states. Early in an engagement little track data is available from which the track filter can produce estimated track states, so there is little information on which to base the discarding of hypotheses, so most or all hypotheses are propagated. As more data becomes available from the sensors the typing block 314 is expected to be able to discount certain hypotheses and to assign low probabilities to other hypotheses. The propagated multihypothesis threat states from target propagator block 316 of FIG. 3 are applied to an engagement planner illustrated as a block 318 together with the likelihood information from typing block 314. Engagement planner 318 also receives interceptor missile flyout data or tables from a block illustrated as 319. Engagement planner 318 uses a subset of the hypotheses to determine an optimal way to engage the target. In order to conserve computational resources, the engagement planner 318 ignores those hypotheses having likelihoods below the threshold. The optimal engagement information is coupled to initialize an interceptor guidance processing illustrated as a block 320. Interceptor guidance block 320 of FIG. 3 receives optimal engagement information from block 318, propagated threat missile states from 316, likelihood information from block 314, and interceptor state information from a block 324. The interceptor state information contains information describing the state of the interceptor (such as position, velocity, and acceleration) at the time that the interceptor guidance function block 320 is entered from block 324. Interceptor guidance block 320 estimates the location of the target at the time of intercept. Launch and intercept guidance commands are applied from interceptor guidance block 320 to the interceptor 322. The intercept guidance commands are preferably based on a boost/ballistic phase guidance algorithm which uses the propagated hypothesis positions and likelihoods to estimate the location of the target at intercept. During guidance a composite track is formed or generated that represents a weighted-average position of the hypotheses. The weighted-average position is a function of each threat hypothesis' position and its associated likelihood. During the course of an engagement, the target state and hypothesis likelihoods are updated as more information becomes available. The track filter 312, the target propagator 316, the engagement planner 318, and the interceptor guidance 320 all take advantage of the new data to refine their solutions.

FIG. 3 is a simplified block diagram illustrating a boost/ballistic or powered/unpowered estimator according to an aspect of the invention, which may be used in the arrangement of FIG. 2 or in any scenario in which the boost or ballistic state of a missile is to be determined. In FIG. 3, the threat missile hypothesis state estimates are coupled by way of paths illustrated as 18 to a memory 20, and to first and second kinematic detection filters illustrated as blocks 22 and 24, and referred to jointly as a Power Detector 96. First filter block 22 has its lag or delay selected for the case of powered motion of the target, and second filter block 24 has its lag or delay selected for the case of unpowered motion of the target When data is outputted from the filters it represents the state of affairs a short duration prior to the current state of affairs. This short duration is the "lag" of the filter.

The output at port 22o of first filter block 22 of FIG. 3 represents the first residuals and the first residual covariances of the filtered data and these are coupled by way of a path 23 to a first input port $26i_1$ of a processor illustrated as a block 26. The output at port 24o of second filter block 24 of FIG. 1 represents the second residuals and the second residual covariances of the filtered data, and these are coupled by way of a path 25 to a second input port $26i_2$ of processor 26.

Processor 26 of FIG. 1 receives the first residuals and first residual covariances at input port $26i_1$ and receives the second residuals and the second residual covariances at input port $26i_2$. Processor 26 processes the information and produces (a) at an output port $26o_1$ a measure or indication of the probability that the target missile is in a powered state and (b) at an output port $26o_2$ a measure or indication of the probability that the target missile is in an unpowered state. The signal appearing at output port $26o_1$, representing the probability of being in powered motion, tends toward unity when the missile is in powered motion and tends toward zero when the missile is in non-powered motion. The signal appearing at output port $26o_2$, representing the probability of being in unpowered motion, tends toward unity when the missile is in non-powered motion and tends toward zero when the missile is in powered motion.

The signal representing the probability that the missile is in powered flight which appears at output port $260_1$ of block 26 of FIG. 1 is coupled to a threshold function illustrated as a block 28. Threshold function 28 compares the signal with a threshold value to make a determination (PWR) as to whether the missile is in powered flight or not. Similarly, the signal representing the probability that the missile is in unpowered flight which appears at output port $260_2$ is coupled to a threshold function illustrated as a block 28. Threshold function 28 compares the signal with a threshold value to make a determination ($\overline{PWR}$) as to whether the missile is in unpowered flight or not. By nature of the processor, the probability that the missile is in powered flight is one (1) minus the probability that the missile is in unpowered flight. Similarly the probability that the missile is in unpowered flight is one (1) minus the probability that the missile is in powered flight.

Regardless of whether the missile is in powered or unpowered flight, both a 9-State Kalman "powered" filter designated 32 and a 6-State Kalman "unpowered" filter designated 34 begin track filtering by initializing with the kinematic data accessed via paths 98 and 27, respectively, from data memory 20. Filtered data from the 9-State Kalman powered motion filter 32 represents position, velocity and acceleration in the x direction, y direction, and z direction $(x,\dot{x},\ddot{x},y,\dot{y},\ddot{y},z,\dot{z},\ddot{z})$. The filtered data from the 9-State Kalman "powered motion" filter 32 is outputted or coupled by way of a path 29 to a 9-State filtered data memory designated 36 and by way of a path 31 to an end user designated 40 if the threshold test determines the missile to be in powered flight. If the threshold test determines that the missile is not in powered flight, the filtered data from powered flight filter 32 is not stored or used. Similarly, the filtered data from the 6-State Kalman "unpowered motion" data filter which represents position and velocity in the x direction, y direction, and z direction $(x,\dot{x},y,\dot{y},z,\dot{z})$, is sent by way of a path 33 to a 6-state filtered data memory 38 and to the end user 40 if the threshold test designated 28 determines the missile to be in unpowered flight, and is not stored or used if the threshold test determines that the missile is not in unpowered flight.

First "powered motion" detector 22 and second "unpowered motion" detector 24 of FIG. 1 continually filter the raw data provided by radar 12o. Prior to a time at which the missile 16 changes from unpowered flight to powered flight, 6-state filter 34 will have been filtering the data and storing information in 6-state memory 38. When missile 16 changes from unpowered flight to powered flight, threshold test block 28 alerts the 9-state Kalman "powered motion" filter 32 via path 37. The 9-state Kalman filter for powered motion will access the 6-state filtered data memory 38 via path 39 for the filtered data provided at t-lag, where t-lag represents the current time minus the lag duration. This data initializes the 9-State "powered flight" filter 32 with the most accurate available data. The raw data in memory 20 will be accessed by the 9-state Kalman filter, 32, for the data points in the interval from t-lag to the current time and filters the data and continually sends the filtered data to the end user 40. This condition continues until the missile switches from powered motion to unpowered motion and the threshold test 28 alerts the change. The 6-State Kalman filter for unpowered motion, 34, will then access the t-lag data stored in the 9-state filtered data memory 36 via link 41, and initialize using the t-lag stored data. Six-state Kalman filter 34 then continues to filter the data in the interval from t-lag to the current time data which is stored in memory 20, and provides filtered data to end user 40.

In FIG. 3, the Power Detector 96 includes two range filters; a range ($\alpha,\beta$) detector filter 24 and a range ($\alpha,\beta,\gamma$) detector filter 22. A fixed lag is used in filtering. Likelihood functions then utilize the filter outputs to calculate probabilities. The Power Detector 96 predictor equations for $\alpha,\beta$ detector filter 24 range direction are $$r_k^p = r_{k-1}^s + \dot{r}_{k-1}^s \Delta$$

$$\dot{r}_k^p = \dot{r}_{k-1}^s$$

where:

$r_k^p$ is the current predicted position data point;

$r_{k-1}^s$ is the most recent corrected position data point;

$\dot{r}_{k-1}^s \Delta$ is the most recent corrected velocity data point;

The power detector 96 $\alpha$-$\beta$ detector filter 24 gain equations in the x direction are given by $$\alpha_r = 1 - \left(\frac{\tau}{T+\tau}\right)^2$$

$$\beta_r = 2\left(\frac{T}{T+\tau}\right)^2$$

where:

$\alpha$ is the filter position gain;

$\tau$ is the fixed lag; and $\beta$ is the filter velocity gain.

The power detector 96 $\alpha$-$\beta$ detector filter 24 corrector equations in the x direction are $$r_k^s = r_k^p + \alpha_r(r_k^m - r_k^p)$$

$$\dot{r}_k^s = \dot{r}_k^p + \frac{\beta_r}{\Delta}(r_k^m - r_k^p)$$

The power detector 96 $\alpha$-$\beta$-$\gamma$ detector filter 22} predictor equations in the x direction are $$r_k^p = r_{k-1}^s + \Delta \dot{r}_{k-1}^s + \frac{1}{2}\ddot{r}_{k-1}^s \Delta^2$$

$$\dot{r}_k^p = \dot{r}_{k-1}^s + \Delta \ddot{r}_{k-1}^s$$

$$\ddot{r}_k^p = \ddot{r}_{k-1}^s$$

The power detector 96 $\alpha$-$\beta$-$\gamma$ detector filter 22 gain equations in the x direction are $$\alpha_r = 1 - \left(\frac{\tau}{T+\tau}\right)^3$$

$$\beta_r = \frac{3(2\tau + T)T^2}{(\tau+T)^3}$$

$$\gamma_r = \frac{6T^3}{(\tau+T)^3}$$

The power detector 96 $\alpha$-$\beta$-$\gamma$ detector filter 22 corrector equations in the x direction are $$r_k^s = x_k^p + \alpha_r(r_k^m - r_k^p)$$

$$\dot{r}_k^s = \dot{r}_k^p + \frac{\beta_r}{\Delta}(r_k^m - r_k^p)$$

$$\ddot{r}_k^s = \ddot{r}_k^p + \frac{\gamma_r}{\Delta^2}(r_k^m - r_k^p)$$

A sliding window memory is maintained in block 20 consisting of current data values as well as a set number of historical points. Specifically, the measurement values for position and velocity (x,y,z and $\dot{x},\dot{y},\dot{z}$) are maintained. Current range values are also found in the memory.

The Optimal tracking filters 94 include two optimal tracking filters 32 and 34. Filter 34 is an optimal $\alpha,\beta$ filter for x,y, and z measurements and the other 32 filter is an optimal $\alpha,\beta,\gamma$ filter for $\dot{x},\dot{y}$, and z measurements. The ($\alpha,\beta$) filter 34 accesses the data from the 9-State Filtered Data Memory 36 and the $\alpha,\beta,\gamma$ filter 32 accessed the data from the 6-State Filtered Data Memory 38 once the powered detector has detected that the vehicle has transitioned between the states of powered and unpowered.

The Optimal filter 94 $\alpha$-$\beta$ optimal filter 34 predictor equations in the x direction are $$x_k^p = x_{k-1}^s + \dot{x}_{k-1}^s \Delta$$

$$\dot{x}_k^p = \dot{x}_{k-1}^s,$$

the Optimal tracking filter 94 $\alpha,\beta$ filter 34 gain equations in the x direction are $$\alpha_x = 1 - \left(\frac{\tau}{T+\tau}\right)^2$$

$$\beta_x = 2\left(\frac{T}{T+\tau}\right)^2, \text{ and}$$

the Optimal tracking filter 94 $\alpha$-$\beta$ filter 34 corrector equations in the x direction are $$x_k^s = x_k^p + \alpha_x(x_k^m - x_k^p)$$

$$\dot{x}_k^s = \dot{x}_k^p + \frac{\beta_x}{\Delta}(r_k^m - r_k^p).$$

The Optimal tracking filter 94 $\alpha$-$\beta$ filter 34 predictor equations in the y direction are $$y_k^p = y_{k-1}^s + \dot{y}_{k-1}^s \Delta$$

$$\dot{y}_k^p = \dot{y}_{k-1}^s,$$

the Optimal tracking filter 94 α-β filter 34 gain equations in the y direction are $$\alpha_y = 1 - \left(\frac{\tau}{T+\tau}\right)^2$$

$$\beta_y = 2\left(\frac{T}{T+\tau}\right)^2, \text{ and}$$

the Optimal tracking filter 94 α-β filter 34 corrector equations in the y direction are $$y_k^s = y_k^p + \alpha_y(r_k^m - r_k^p)$$

$$\dot{y}_k^s = \dot{y}_k^p + \frac{\beta_y}{\Delta}(y_k^m - y_k^p).$$

The Optimal tracking filter 94 α-β filter 34 predictor equations in the z direction are $$z_k^p = z_{k-1}^s + \dot{z}_{k-1}^s \Delta$$

$$\dot{z}_k^p = \dot{z}_{k-1}^s,$$

the Optimal tracking filter 94 α-β filter 34 gain equations in the z direction are $$\alpha_z = 1 - \left(\frac{\tau}{T+\tau}\right)^2$$

$$\beta_z = 2\left(\frac{T}{T+\tau}\right)^2, \text{ and}$$

the Optimal tracking filter 94 α-β filter 34 corrector equations in the z direction are $$z_k^s = z_k^p + \alpha_z(z_k^m - z_k^p)$$

$$\dot{z}_k^s = \dot{z}_k^p + \frac{\beta_z}{\Delta}(z_k^m - z_k^p)$$

The Optimal tracking filter 94 α-β-γ filter filter equations in the x direction are $$x_k^p = x_{k-1}^s + \Delta \dot{x}_{k-1}^s + \frac{1}{2}\ddot{x}_{x-1}^s \Delta^2$$

$$\dot{x}_x^p = \dot{x}_{k-1}^s + \Delta \ddot{x}_{k-1}^s$$

$$\ddot{x}_k^p = \ddot{x}_{k-1}^s.$$

The Optimal tracking filter 94 α-β-γ filter 32 gain equations in the x direction are $$\alpha_x = 1 - \left(\frac{\tau}{T+\tau}\right)^3$$

$$\beta_x = \frac{3(2\tau+T)T^2}{(\tau+T)^3}$$

-continued $$\gamma_x = \frac{6T^3}{(\tau+T)^3}$$

The Optimal tracking filter 94 α-β-γ filter 32 corrector equations in the x direction are $$x_k^s = x_k^p + \alpha_x(x_x^m - x_k^p)$$

$$\dot{x}_k^s = \dot{x}_k^p + \frac{\beta_x}{\Delta}(x_k^m - x_k^p)$$

$$\ddot{x}_k^s = \ddot{x}_k^p + \frac{\gamma_x}{\Delta^2}(x_k^m - x_k^p)$$

The Optimal tracking filter 94 α-β-γ filter 32 predictor equations in the y direction are $$y_k^p = y_{k-1}^s + \Delta \dot{y}_{k-1}^s + \frac{1}{2}\ddot{y}_{k-1}^s \Delta^2$$

$$\dot{y}_k^p = \dot{y}_{k-1}^s + \Delta \ddot{y}_{k-1}^s$$

$$\ddot{y}_k^p = \ddot{y}_{k-1}^s,$$

the Optimal tracking filter 94 α-β-γ filter 32 gain equations in the y direction are $$\alpha_y = 1 - \left(\frac{\tau}{T+\tau}\right)^3$$

$$\beta_y = \frac{3(2\tau+T)T^2}{(\tau+T)^3}$$

$$\gamma_y = \frac{6T^3}{(\tau+T)^3}, \text{ and}$$

the Optimal tracking filter 94 α-β-γ filter 32 corrector equations in the y direction are $$y_k^s = y_k^p + \alpha_y(y_k^m - y_k^p)$$

$$\dot{y}_k^s = \dot{y}_k^p + \frac{\beta}{\Delta}(y_k^m - y_k^p)$$

$$\ddot{y}_k^s = \ddot{y}_k^p + \frac{\gamma_y}{\Delta^2}(y_k^m - y_k^p)$$

The Optimal tracking filter 94 α-β-γ filter 32 predictor equations in the z direction are $$z_k^p = z_{k-1}^s + \Delta \dot{z}_{k-1}^s + \frac{1}{2}\ddot{z}_{k-1}^s \Delta^2$$

$$\dot{z}_k^p = \dot{z}_{k-1}^s + \Delta \ddot{z}_{k-1}^s$$

$$\ddot{z}_k^p = \ddot{z}_{k-1}^s,$$

the Optimal tracking filter 94 α-β-γ filter 32 gain equations in the z direction are $$\alpha_z = 1 - \left(\frac{\tau}{T+\tau}\right)^3$$

$$\beta_z = \frac{3(2\tau+T)T^2}{(\tau+T)^3}$$

$$\gamma_z = \frac{6T^3}{(\tau+T)^3}, \text{ and}$$

the Optimal tracking filter 94 $\alpha$-$\beta$-$\gamma$ filter 32 corrector equations in the z direction are $$z_k^s = z_k^p + \alpha_z(z_k^m - z_k^p)$$

$$\dot{z}_k^s = \dot{z}_k^p + \frac{\beta_z}{\Delta}(z_k^m - z_k^p)$$

$$\ddot{z}_k^s = \ddot{z}_k^p + \frac{\gamma_z}{\Delta^2}(z_k^m - z_k^p)$$

In order to determine the Mode Probability, let $\mu_i^n$ be the mode probability for the modes i=1, 2 where i=1 for the $\alpha$-$\beta$ filter 34 for mode, i=2 for the $\alpha$-$\beta$-$\gamma$ filter 32 mode, and n=observation time. Then $\mu_i^n$ can be described by $$\mu_i^n = \frac{\Lambda_i^n \mu_i^{n-1}}{\Lambda_1^n \mu_1^{n-1} + \Lambda_2^n \mu_2^{n-1}}, i=1, 2$$

where $\Lambda_i^n$ is the likelihood function given by $$\Lambda_i^n = \frac{e^{[-\frac{1}{2}(v_i^n)^T(S_i^n)^{-1}(v_i^n)]}}{(2\pi)^{\frac{3}{2}}|S_i^n|^{\frac{1}{2}}}$$

where $v_i^n$ is the filter residual for mode i, and $S_i^n$ is the filter residual covariance for mode i given by $$S_i^n = \left(\frac{\sigma(n)_{m_i}^2}{(1-\alpha_i^n)}\right),$$

where $|S_i^n|$ is the determinant of $S_i^n$, $\alpha_i^n$ is the filter gain for mode i, and $$\sigma(n)_{m_i}^2$$

is the measurement error variance.

For the case of optimal gains in optimal gains track filtering, the lag $\tau$ must be evaluated using the standard deviation of measurement error variance denoted here by $\sigma$. In the $\alpha$-$\beta$ filter 34, the optimal lag $\tau$ may be equated as $$\tau = T^{1/5}\left(\frac{3n\sigma_m}{2A}\right)^{2/5}$$

where $\sigma$ represents the measurement error, and the subscript m may be written as x, y, or z depending on the coordinate being filtered. The term A represents the powered acceleration, T the data rate, and n the confidence factor.

For the lag calculation in the $\alpha$-$\beta$-$\gamma$ filter of 32, the optimal lag $\tau$ may be equated as $$\tau = T^{1/7}\left(\frac{15n\sigma_m}{2J}\right)^{2/7}$$

where $\sigma$ represents the measurement error, and the subscript m may be written as x, y, or z depending on the coordinate being filtered. The term A represents the powered acceleration, T the data rate, and n the confidence factor.

In the case of the optimal filters 94, measurement error must be calculated in order to determine the lag. The measurement error in Cartesian coordinates is $$R_m = J\begin{bmatrix} \sigma_r^2 & & \\ & r\sigma_{AZ}^2 & \\ & & r\sigma_{EL}^2 \end{bmatrix} J^T$$

with $$J = \begin{bmatrix} \cos(EL)\sin(AZ) & \cos(EL)\sin(AZ) & -\sin(EL)\sin(AZ) \\ \cos(EL)\cos(AZ) & -\cos(EL)\sin(AZ) & -\sin(EL)\cos(AZ) \\ \sin(EL) & 0 & \cos(EL) \end{bmatrix}$$

Thus, $$\sigma_{m_x}^2 = R_m(1,1) \Rightarrow \sigma_{m_x} = \sqrt{R_m(1,1)}$$

$$\sigma_{m_y}^2 = R_m(2,2) \Rightarrow \sigma_{m_y} = \sqrt{R_m(2,2)}$$

$$\sigma_{m_z}^2 = R_m(3,3) \Rightarrow \sigma_{m_z} = \sqrt{R_m(3,3)}$$

$\sigma_{m_x}, \sigma_{m_y}, \sigma_{m_z}$ are used in calculating optimal lag $\tau$, which in turn is used to calculate the optimal filter gains ($\alpha$-$\beta$-$\gamma$) for ($\alpha$-$\beta$) filter and ($\alpha$-$\beta$-$\gamma$) filter.

What is claimed is:

1. A method for engaging a target missile with an interceptor missile, said method comprising the steps of:

sensing three-dimensional kinematic features of the target missile to thereby generate sensed kinematic data;

storing the current value of said three-dimensional kinematic features, and a set of previous values of said three-dimensional kinematic features;

passing at least a portion of the current value of said sensed kinematic data through a first filter having a fixed first filter lag, said first filter being suited for maneuver motion of said vehicle to generate first residuals and first residual covariances;

passing at least a portion of the current value of said sensed kinematic data through a second filter having a fixed second filter lag, said second filter being suited for non-maneuver motion of said vehicle to generate second residuals and second residual covariances;

determining, from said first residuals, said first residual covariances, said second residuals, and said second residual covariances, the probability of being in maneuvering motion and the probability of being in non-maneuvering motion, which probability of being in maneuvering motion tends toward unity when the vehicle is in maneuvering motion and tends toward zero when the vehicle is in non-maneuvering motion, and which probability of being in non-maneuvering motion tends toward unity when the vehicle is in non-maneuvering motion and tends toward zero when said vehicle is in maneuvering motion;

comparing said probability of being in maneuvering motion and said probability of being in non-maneuvering motion with at least one threshold value, to thereby deem the vehicle to be in maneuvering motion if the probability of being in maneuvering motion exceeds said threshold value, and to deem the vehicle to be in non-maneuvering motion if the probability of being in non-maneuvering motion exceeds said threshold value;

if the vehicle is deemed to be in maneuvering motion, applying a set of said three-dimensional kinematic features corresponding to said first lag to a nine-state Kalman filter to produce an optimal state for said maneuvering motion; and if the vehicle is deemed to be in non-maneuvering motion, applying a set of said three-dimensional kinematic features corresponding to said second lag to a six-state Kalman filter to produce an optimal state for said non-maneuvering motion;

applying said optimal states to (a) a missile engagement planner for initialization of interceptor guidance and (b) to an interceptor for guidance of said interceptor toward said target missile.

2. A method for estimating or determining transitions between powered and unpowered motion of a target missile, said method comprising the steps of:

sensing three-dimensional kinematic features of the target to thereby generate sensed kinematic data;

storing the current value of said three-dimensional kinematic features, and a set of previous values of said three-dimensional kinematic features;

passing at least a portion of the current value of said sensed kinematic data through a first filter having a fixed first filter lag, said first filter being suited for powered motion of said missile to generate first residuals and first residual covariances;

passing at least a portion of the current value of said sensed kinematic data through a second filter having a fixed second filter lag, said second filter being suited for non-powered motion of said missile to generate second residuals and second residual covariances;

determining, from said first residuals, said first residual covariances, said second residuals, and said second residual covariances, the probability of being in powered motion and the probability of being in non-powered motion, which probability of being in powered motion tends toward unity when the missile is in powered motion and tends toward zero when the missile is in non-powered motion, and which probability of being in non-powered motion tends toward unity when the missile is in non-powered motion and tends toward zero when said missile is in powered motion;

comparing said probability of being in powered motion and said probability of being in non-powered motion with at least one threshold value, to thereby deem the missile to be in powered motion if the probability of being in powered motion exceeds said threshold value, and to deem the missile to be in non-powered motion if the probability of being in non-powered motion exceeds said threshold value;

if the missile is deemed to be in powered motion, applying a set of said three-dimensional kinematic features corresponding to said first lag to a nine-state Kalman filter to produce an optimal state for said powered motion; and if the missile is deemed to be in non-powered motion, applying a set of said three-dimensional kinematic features corresponding to said second lag to a six-state Kalman filter to produce an optimal state for said non-powered motion.

3. A method according to claim 2, further comprising the steps of initializing an interceptor missile with information relating to said target missile, and applying interceptor guidance commands to said interceptor missile during flight to intercept said target missile.

4. A method for estimating or determining transitions between maneuver and nonmaneuver motion of airborne vehicle, said method comprising the steps of:

sensing three-dimensional kinematic features of the target to thereby generate sensed kinematic data;

storing the current value of said three-dimensional kinematic features, and a set of previous values of said three-dimensional kinematic features;

passing at least a portion of the current value of said sensed kinematic data through a first filter having a fixed first filter lag, said first filter being suited for maneuver motion of said vehicle to generate first residuals and first residual covariances;

passing at least a portion of the current value of said sensed kinematic data through a second filter having a fixed second filter lag, said second filter being suited for non-maneuver motion of said vehicle to generate second residuals and second residual covariances;

determining, from said first residuals, said first residual covariances, said second residuals, and said second residual covariances, the probability of being in maneuvering motion and the probability of being in non-maneuvering motion, which probability of being in maneuvering motion tends toward unity when the vehicle is in maneuvering motion and tends toward zero when the vehicle is in non-maneuvering motion, and which probability of being in non-maneuvering motion tends toward unity when the vehicle is in non-maneuvering motion and tends toward zero when said vehicle is in maneuvering motion;

comparing said probability of being in maneuvering motion and said probability of being in non-maneuvering motion with at least one threshold value, to thereby deem the vehicle to be in maneuvering motion if the probability of being in maneuvering motion exceeds said threshold value, and to deem the vehicle to be in non-maneuvering motion if the probability of being in non-maneuvering motion exceeds said threshold value;

if the vehicle is deemed to be in maneuvering motion, applying a set of said three-dimensional kinematic features corresponding to said first lag to a nine-state Kalman filter to produce an optimal state for said maneuvering motion; and if the vehicle is deemed to be in non-maneuvering motion, applying a set of said three-dimensional or full kinematic features corresponding to said second lag to a six-state Kalman filter to produce an optimal state for said non-maneuvering motion.

* * * * *